March 24, 1925.
C. RABSTEIN
1,530,912
SPIRAL FOR CORE MOLDING MACHINES
Filed Aug. 13, 1921
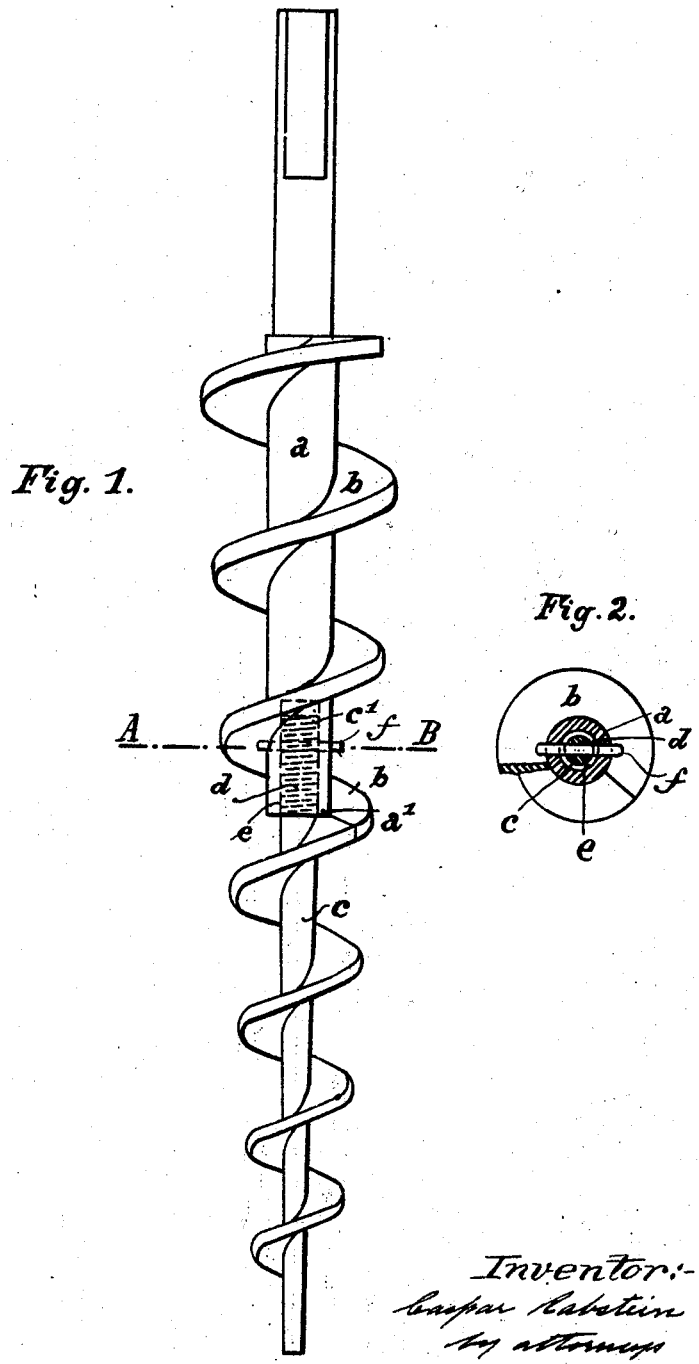

Patented Mar. 24, 1925.

1,530,912

UNITED STATES PATENT OFFICE.

CASPAR RABSTEIN, OF DRESDEN, GERMANY, ASSIGNOR TO FRANZ KUSTNER, OF DRESDEN, GERMANY.

SPIRAL FOR CORE-MOLDING MACHINES.

Application filed August 13, 1921. Serial No. 492,062.

*To all whom it may concern:*

Be it known that I, CASPAR RABSTEIN, mechanician, a subject of the Republic of Germany, and resident of Oberseengasse 8, Dresden, Republic of Saxony, German Republic, have invented a new and useful Improvement in Spirals for Core-Molding Machines, for which I filed application in Germany Nov. 13, 1916, of which the following is a specification.

It is well known to make use of spirals in connection with core-molding machines, said spirals allowing to press or squeeze the sand through core-boxes. When using said spirals in the core-molding-machines mentioned, it has been found a great drawback that the spirals are worn or wasted too rapidly. Especially the points of the spirals forming the parts which are most exposed to wear, are worn very rapidly.

Now the present invention has for its object to obviate the drawback mentioned above.

For this purpose the spiral is formed and arranged as follows:

The central-mandrel consists of wrought-iron and is therefore infrangible. The steel windings of the spiral first wound separately are hereafter soldered on the central-mandrel by hard-soldering. When the screw is soldered to the mandrel, the soldering operation will cause the screw and mandrel to become heated, and while the screw is still hot, the latter is exposed to a sudden cooling effect by submerging the screw in cold water, whereby the windings of the screw are rendered glass hard.

The point of the spiral forming the part exposed to wear in the most intense manner will, in spite of its hardness, nevertheless be subject by and by to wear. In view of this fact the spiral-point is interchangeable, as is usual with other tools. For this purpose the point of the spiral which is made in precisely the same manner as the other windings, is provided with a thread suitable for screwing it into the central mandrel of the spiral or any other manner suitable for joining it with said mandrel may be used.

The drawing annexed to this description represents an example of construction of these spirals for core-molding machines, according to the present invention.

Fig. 1 is a longitudinal elevation and Fig. 2 a horizontal section according to line A—B in Fig. 1.

$a$ is the middle or central mandrel onto which the independently wound windings $b$ of steel are soldered by hard-soldering. For rendering glass-hard said steel spiral-windings $b$, they are rapidly cooled down within the soldering-heat itself. The point $c$ of the spiral being the part of the tool most exposed to wear is arranged interchangeable. For this purpose, the spiral-point, the windings of which are made in the same manner as the other windings of the tool, is provided at its extremity $c^1$ with a thread $d$ to be screwed into a hole $e$ provided at the extremity $a^1$ of the central mandrel $a$ for the spiral $b$. The connection of both parts, viz., the mandrel $a$ and the point $c$ can furthermore be ensured by a pin $f$.

Instead of a screw-connection any other suitable way of connection may be used.

What I claim is:

1. A tool for core molding machines, comprising a mandrel of relatively soft metal and a spiral thread of relatively hard metal secured to said mandrel, the diameter of said thread being progressively diminished toward the end of the mandrel.

2. A tool for core molding machines, comprising a mandrel of relatively soft metal and a spiral thread of relatively hard metal soldered to said mandrel, the diameter of said thread being progressively diminished toward the end of the mandrel.

3. A tool for core molding machines, comprising a tapered mandrel of relatively soft metal and a spiral thread of relatively hard metal secured to said mandrel, the diameter of said thread being progressively diminished toward the end of the mandrel.

4. A tool for core molding machines, comprising a tapered mandrel of relatively soft metal and a spiral thread of relatively hard metal soldered to said mandrel, the diameter of said thread being progressively diminished toward the end of the mandrel.

5. A tool for core molding machines, comprising a tapered mandrel of relatively soft metal and a spiral thread of relatively hard metal secured a distance from the bottom of the mandrel to form a point for the tool, the diameter of said thread being progressively diminished toward said point.

6. A tool for core molding machines, comprising a tapered mandrel of relatively soft metal and a spiral thread of relatively hard metal soldered a distance from the bottom of the mandrel to form a point for the tool, the diameter of said thread being progressively diminished toward said point.

7. A tool for core molding machines, comprising separable members, means for connecting said members, each of said members being provided with a mandrel of relatively soft metal and a spiral thread of relatively hard metal secured to said mandrel, the diameter of said thread being progressively diminished toward the end of the mandrel.

8. A tool for core molding machines, comprising separable members, means for connecting said members, each of said members being provided with a mandrel of relatively soft metal and a spiral thread of relatively hard metal soldered to said mandrel, the diameter of said thread being progressively diminished toward the end of the mandrel.

9. A tool for core molding machines, comprising separable members, means for connecting said members, each of said members being provided with a tapered mandrel of relatively soft metal and a spiral thread of relatively hard metal secured to said mandrel, the diameter of said thread being progressively diminished toward the end of the mandrel.

10. A tool for core molding machines, comprising separable members, means for connecting said members, each of said members being provided with a tapered mandrel of relatively soft metal and a spiral thread of relatively hard metal soldered to said mandrel, the diameter of said thread being progressively diminished toward the end of the mandrel.

11. A tool for core molding machines, comprising separable members, means for connecting said members, each of said members being provided with a tapered mandrel of relatively soft metal and a spiral thread of relatively hard metal secured to said mandrel, the diameter of said thread being progressively diminished toward the end of the mandrel, one of said members having its mandrel extended to form a point below said threads.

12. A tool for core molding machines, comprising separable members, means for connecting said members, each of said members being provided with a tapered mandrel of relatively soft metal and a spiral thread of relatively hard metal soldered to said mandrel, the diameter of said thread being progressively diminished toward the end of the mandrel, one of said members having its mandrel extended to form a point below said threads.

In testimony that I claim the foregoing as my invention, I have signed my name in presence of two witnesses, this twentieth day of July, 1921.

CASPAR RABSTEIN.

Witnesses:
 M. HANSDING,
 C. SCHLEMBACH.